Feb. 10, 1925.

A. B. COX 1,525,642

GEAR TEETH AND METHOD OF DESIGNING THE SAME

Original Filed Sept. 28, 1922    6 Sheets-Sheet 1

WITNESSES:

INVENTOR
A. B. Cox.
BY
ATTORNEY

Feb. 10. 1925.

A. B. COX 1,525,642

GEAR TEETH AND METHOD OF DESIGNING THE SAME

Original Filed Sept. 28, 1922    6 Sheets-Sheet 3

WITNESSES:

INVENTOR
A.B.Cox.
BY
    Howard L. Godfrey
        ATTORNEY

Patented Feb. 10, 1925.

1,525,642

UNITED STATES PATENT OFFICE.

ANTHONY B. COX, OF PITTSBURGH, PENNSYLVANIA.

GEAR TEETH AND METHOD OF DESIGNING THE SAME.

Application filed September 28, 1922, Serial No. 591,092. Renewed December 24, 1924.

*To all whom it may concern:*

Be it known that I, ANTHONY B. COX, a citizen of the United States, and a resident of Pittsburgh, in the county of Allegheny and State of Pennsylvania, have invented a new and useful Improvement in Gear Teeth and Methods of Designing the Same, of which the following is a specification.

My invention relates to gear-wheel mechanisms embodying either internal or external gear combinations.

The principal object of my invention is to provide a smooth running gear mechanism comprising a pair of meshing gears, wherein the vibrations incident to the operation of the usual type of gear-wheel mechanism are substantially eliminated.

Another object of my invention is to provide a pair of mating gear wheels embodying a design, wherein the load upon each of the teeth in mesh is maintained substantially constant throughout the meshing period of the same.

Other objects of my invention will appear more fully hereinafter from the following description of the nature, the mode of operation and the constructional details of the gear-wheel mechanism embodying my invention.

I have observed that, in the customary gear-wheel mechanism embodying a pair of meshing gear wheels, a non-integral number of pairs of teeth are in contact during the operation thereof. That is to say, an even and an odd number of pairs of teeth are successively in engagement throughout the period of operation of the gear-wheel mechanism. Since, in the ordinary spur gear, all the teeth of the meshing gear have the same width across the face of the gear in a direction parallel to the gear axis, the total length of tooth carrying the load will be given by the product of the total number of pairs of teeth in contact and the width of the face of the gear. The width of the face being a constant quantity, the total length of tooth carrying the load will vary with the number of pairs of teeth in contact, which as just pointed out, varies from instant to instant in an ordinary pair of gears.

When an even number of pairs of teeth are in contact, as two pairs of teeth, the power or load transmitted through the gear-wheel mechanism is carried by the two pairs of teeth. When an odd number of pairs of teeth are in contact, as three pairs of teeth, said power is carried by the three pairs of teeth. Hence, it can be seen that the individual teeth of the mechanism are subjected to rapidly varying loads which results in vibration, not only of the contacting teeth, but also of the driven gear wheel of the mechanism. The latter vibration is especially serious because it involves a vibration of a relatively large mass, namely that of the entire driven gear wheel, together with its load.

I have further observed that the above-mentioned desired results may be easily and efficiently obtained by providing a gear-wheel mechanism, wherein an integral number of pairs of teeth are constantly in contact. That is to say, a mechanism wherein the load is carried by a constant total length of gear tooth at all times.

A gear-wheel mechanism embodying such design may be obtained by any of the following methods, either singly or in combination: First, by choosing a suitable number of teeth for gears of a given ratio; second, by choosing a suitable angle for the line of action; third, by choosing a suitable relative length for the addendum; and fourth, by increasing or decreasing the distance between the centers of a pair of co-operating gears a suitable amount.

The following methods are applicable to helical, worm and spiral bevel gears only; fifth, by choosing a suitable helix angle for the direction of the tooth across the face of the gear; and sixth, by choosing a suitable width for the face of the gear.

My invention further consists in the details of arrangement, operation and design hereinafter set forth and claimed and illustrated in the accompanying drawing, wherein Figure 1 is a diagram showing the co-operating teeth of a rack and pinion, together with certain other details which will be used in the mathematical analysis of the first method of design, namely, the choosing of a suitable number of teeth for gears of a given ratio.

The following defines the symbols hereinafter employed in the specification and drawing:

$\pi$ = 3.1416.

$P_n$ = diametral or normal pitch in helical gears.

$P$ = diametral pitch.

$P_c$ = circular pitch.

$P_x$ = circular pitch of helical gear in a plane perpendicular to the axis of the gear.

$\phi$ = angle of line of action or degree of involute.

$\phi'$ = effective angle of line of action in plane perpendicular to the axis of the helical gear.

$\gamma$ = effective angle of line of action or degree of involute in spur gears with increased center distance.

$n$ = number of teeth in pinion.

$N$ = number of teeth in gear.

$n_e$ = effective number of teeth in bevel or helical pinion.

$N_e$ = effective number of teeth in bevel or helical gear.

$R$ = pitch radius of gear.

$r$ = pitch radius of pinion.

$k = \dfrac{N}{n}$.

$K_e$ = effective ratio of bevel or helical gears.

$x$ = co-ordinate of point at intersection of line of action with outside diameter of pinion, the center of the pinion being the origin.

$L_p$ = length of line of action intercepted by line of centers and outside diameter of pinion.

$L_g$ = length of line of action intercepted by line of centers and outside diameter of gear.

$L_R$ = length of line of action intercepted by line of centers and outside diameter of rack.

$L_T = L_p + L_g$ for the case of the gear and pinion and $L_p + L_R$ for the case of the rack and pinion.

$$M_p = \frac{L_p}{P_c \cos \phi}$$

$$M_g = \frac{L_g}{P_c \cos \phi}$$

$$M_R = \frac{L_R}{P_c \cos \phi}$$

$M_t$ = total number of pairs of teeth in contact in a pair of meshing gears. For the case of the gear and pinion $M_t = M_p + M_g$; whereas for the case of the rack and pinion $M_t = M_p + M_R$.

$A$ = length of addendum.

$q = \dfrac{A}{P_c}$ = ratio of length of addendum to circular pitch.

$q_x = \dfrac{A}{P_x}$.

$S$ = distance between the pitch circles of two meshing gears measured on the line of centers.

$s'$ = amount of change of addendum of pinion teeth caused by $S$.

$s''$ = amount of change of addendum of gear teeth caused by $S$.

$w = \dfrac{S}{r}$.

$H = R + s''$.

$h = r + s'$.

$x$ = helix angle of helical gear.

$B = \frac{1}{2}$ of the front pitch cone angle of a bevel pinion.

$W_o$ = width of gear necessary to apply the 6th method of design.

Figure 9:
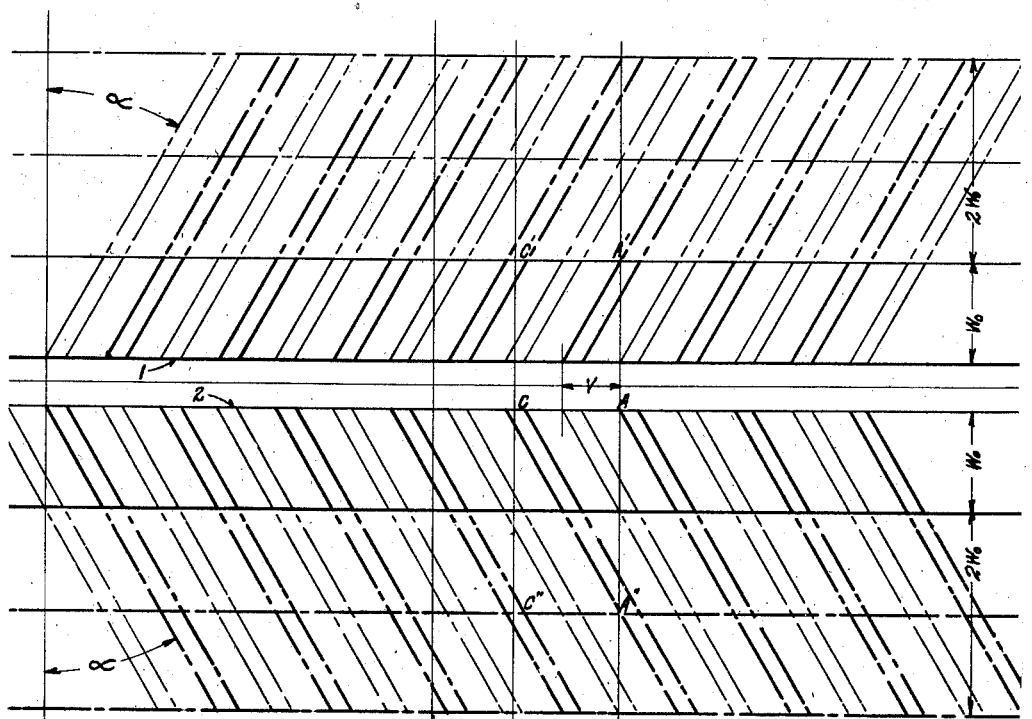
Fig. 9 is a diagrammatic plan view of a pair of helical racks wherein the teeth are cut according to a right hand helix and according to a left hand helix, respectively.

$V$ = distance giving relative positions of the two halves of helical gears, as shown in Fig. 9.

The first method, namely, the choosing of a suitable number of teeth for gears of a given ratio, is based upon the following analysis:

Assuming that the teeth of a pair of meshing gear-wheels are so accurately cut that all the pairs of teeth that should theoretically be in contact are in contact, then the theoretical number of pairs of teeth in contact may easily be calculated. Moreover, the number of pairs of teeth in contact with gears of any ratio and any numbers of teeth may be calculated and plotted in curve form, all as hereinafter explained.

Figure 1:
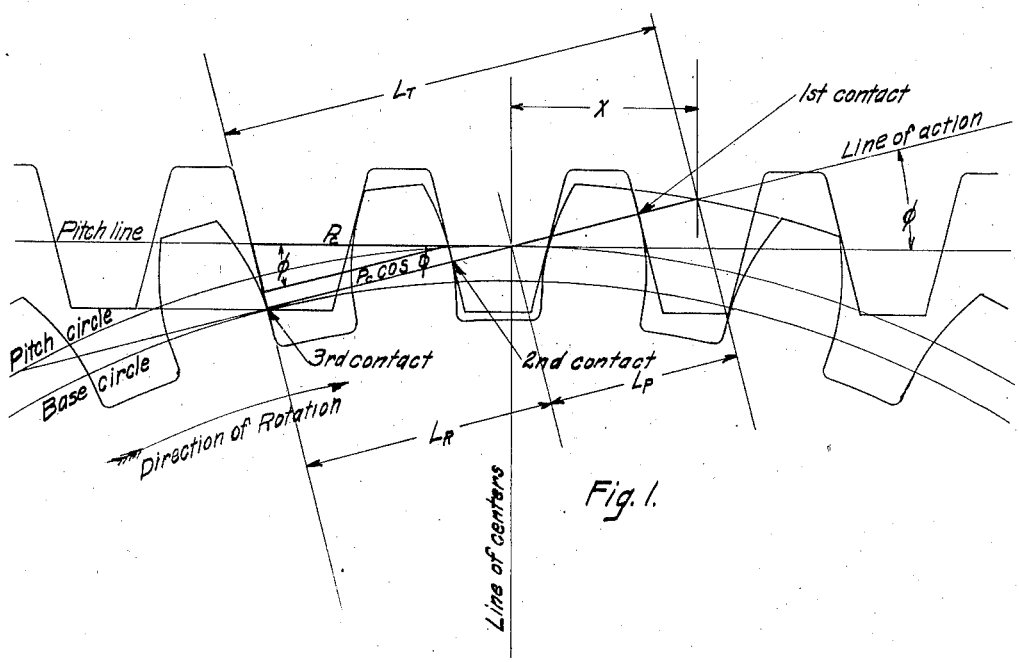

Referring to Figure 1, it is seen that the tooth-contacts are made only on the line of action and that the distance measured on the line of action from a point on one tooth to a corresponding point on the next tooth is $P_c \cos \phi$. In order to ascertain the total number of pairs of teeth $M_t$ in contact, it is necessary to find the total length $L_T$ of the line of action and divide by $P_c \cos \phi$. The integral part of the number $M_t$ indicates the minimum number of pairs of teeth that will always be in contact during the operation of the gears, while the decimal part of the number indicates the relative length of time an additional pair of teeth will be in contact. In determining the total number of pairs of teeth $M_t$ in contact, it has been found more convenient to ascertain the number of pairs of teeth in contact $M_p$ for the pinion only and then add to this the number of pairs of teeth in contact $M_R$ or $M_g$ for the rack or gear, respectively. That is to say, $M_t = (M_R \text{ or } M_g) + M_p$.

The derivation of the formula for $M_p$ for teeth of standard length is as follows:

$$x^2 + y^2 = (r+A)^2 = \left(r+\frac{1}{P}\right)^2 = \frac{r^2}{n^2}(n+2)^2 =$$

equation of outside diameter of pinion.

$$y = (x \tan \phi + r) =$$

equation of line of action.

Substituting this value of $y$ in the first equation:

$$x^2 + (x \tan \phi + r)^2 = \frac{r^2}{n^2}(n+2)^2.$$

Expanding:

$$x^2 + x^2 \tan^2 \phi + 2xr \tan \phi + r^2 = (n^2 r^2 + 4nr^2 + 4r^2) \div n^2.$$

Clearing fractions:

$$n^2 x^2 (1 + \tan^2 \phi) + 2xrn^2 \tan \phi + n^2 r^2 = n^2 r^2 + 4nr^2 + 4r^2.$$

Combining terms:

$$n^2 x^2 \sec^2 \phi + 2xrn^2 \tan \phi - 4r^2(n+1) = 0.$$

Solving:

$$x = \frac{-n^2 r \tan \phi \pm \sqrt{n^4 r^2 \tan^2 \phi + 4n^2 r^2 \sec^2 \phi\, (n+1)}}{n^2 \sec^2 \phi}$$

$$= \frac{-n^2 r \frac{\sin \phi}{\cos \phi} \pm \frac{n^2 r}{\cos \phi}\sqrt{\sin^2 \phi + \frac{4}{n^2}(n+1)}}{\frac{n^2}{\cos^2 \phi}}$$

$$= -r \sin \phi \cos \phi \pm r \cos \phi \sqrt{\sin^2 \phi + \frac{4}{n^2}(n+1)}$$

$$L_p = \frac{x}{\cos \phi} = r\left[-\sin \phi \pm \sqrt{\sin^2 \phi + \frac{4}{n^2}(n+1)}\right]$$

By definition:

$$P_c = \frac{2\pi r}{n}$$

and $$M_p = \frac{L_p}{P_c \cos \phi}$$

$$= \frac{n}{2\pi \cos \phi}\left[-\sin \phi \pm \sqrt{\sin^2 \phi + \frac{4}{n^2}(n+1)}\right] \quad (1)$$

Clearing fractions:

$$2\pi M_p \cos \phi + n \sin \phi = \pm n\sqrt{\sin^2 \phi + \frac{4}{n^2}(n+1)}$$

Squaring:

$$4\pi^2 M_p^2 \cos^2 \phi + 4\pi n M_p \sin \phi \cos \phi + n^2 \sin^2 \phi = n^2 \sin^2 \phi + 4n + 4.$$

Combining terms:

$$\pi^2 M_p^2 \cos^2 \phi + \pi n M_p \sin \phi \cos \phi - n - 1 = 0$$

Solving for $n$:

$$n = \frac{1 - \pi^2 M_p^2 \cos^2 \phi}{\pi M_p \sin \phi \cos \phi - 1} \quad (2)$$

The preceding formula holds for gears and racks as well as for pinions. For a rack, $n = \infty$, and we have $$\pi M_p \sin \phi \cos \phi - 1 = 0$$

Substituting $M_R$ for $M_p$, $$M_R = \frac{1}{\pi \sin \phi \cos \phi} \quad (3)$$

Figure 2:
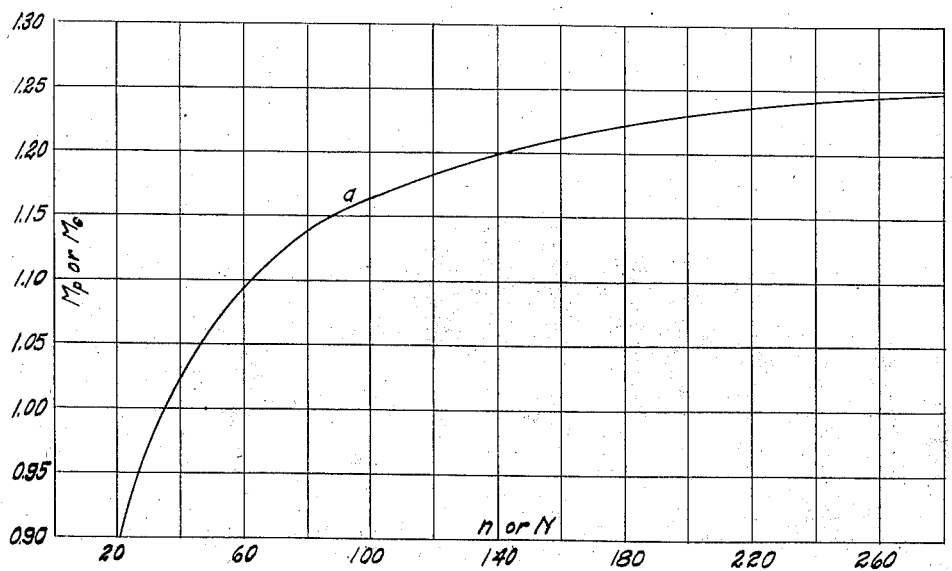
Fig. 2 is a curve diagram showing the relation between the number of pairs of teeth in contact $M_g$ or $M_p$, as ordinates, and the number of teeth $n$ in the pinion as abscissæ, and is employed in the first method of design.

Values of $M$, that is, $M_p$ or $M_g$ may now be plotted against values of $n$ using equation 2, as the form most convenient for plotting, and assuming a 14½° Std. involute gear tooth, all as shown by curve $a$ in Fig. 2.

Figure 3:
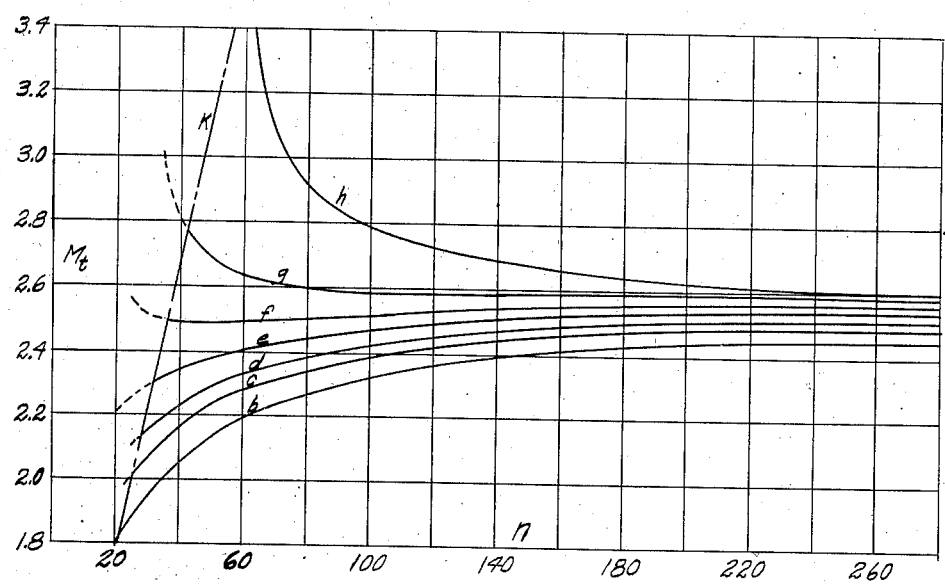
Fig. 3 is a curve diagram showing the relation between the total number of teeth $M_t$ in contact and the number of teeth $n$ in the pinion for different gear ratios and for a standard $14\frac{1}{2}°$ tooth.

In Fig. 3 is shown a series of curves derived from curve $a$ of Fig. 2, illustrating the relation between the total number of teeth in contact $M_t$ as ordinates and the number of teeth in the pinion as abscissæ, for different values of gear ratios. Curves $b$, $c$, $d$ and $e$ are for external gear wheel mechanisms having a 14½° standard tooth and gear ratios of 1 to 1; 1 to 2; 1 to 4 and 1 to $\infty$, that is, a rack and pinion. Curves $f$, $g$ and $h$ are for internal gear-wheel mechanisms having gear ratios of 1 to 4, 1 to 2, and 1 to 1.

The dotted line curve $k$ in Fig. 3 is plotted according to the formula $$\frac{n}{N} = \frac{4n - 2n^2 \sin^2 \phi}{n^2 \sin^2 \phi - 4} \quad (4)$$

which was developed in the October 14th, 1920 number of the American Machinist. The formula (4) indicates the limiting portions of the several curves in Fig. 3 beyond which tooth interference or imperfect action obtains.

The solid line curves in Fig. 3 are easily obtained from the curve $a$ of Fig. 2, for any ratio of gears desired, by adding the number of pairs of teeth in contact $M_p$ on the pinion side of the line of centers corresponding to the number of teeth in the pinion to the number of pairs of teeth in contact $M_g$ on the gear side of the line of centers; corresponding to the number of teeth in the gear, thus obtaining the total number of pairs of teeth in contact $M_t$ for a particular gear ratio and for a pinion and gear having certain numbers of teeth. For example, for a 1 to 2 ratio of gears, and for a 50 tooth pinion, $M_p$ is 1.075, whereas $M_g$ for the gear wheel which would of course have 100 teeth, is 1.175. The total number of pairs of teeth in contact $M_t$ for a gear-wheel having this particular gear-wheel ratio and number of teeth is, therefore, 2.250. This number, 2.250, indicates that there will always be two pairs of teeth in contact and that for approximately one-fourth of the time, a third pair of teeth will be in contact and sharing the load.

The formula for the number of pairs of teeth in contact for standard internal gears is found by a method exactly similar to the above and is as follows:

$$N = \frac{\pi^2 M_g^2 \cos^2 \phi - 1}{\pi M_g \sin \phi \cos \phi - 1} \quad (5)$$

From an observation of the several curves of Fig. 3, it is seen that the standard 14½° tooth does not lend itself particularly to the first method of designing gear-wheel mechanisms having the desired integral number of pairs of teeth in contact, except for certain gear ratios lying between the 1 to 1 and 2 to 1 ratios and for pinions having from 26 to 35 teeth and internal gears with pinions having from 48 to 73 teeth and gear ratios lying between 2 to 1 and 1 to 1. The one-to-one ratio of internal gears, of course has no meaning except as showing the theoretical limit of the number of pairs of teeth in contact as the gear ratio approaches unity.

Somewhat similar results were obtained by employing a gear-wheel mechanism having a standard length of tooth and a 22½° line of action. However, as shown in the several curves of Fig. 4, wherein the total number of teeth in contact $M_t$ is plotted against the number of teeth in the pinion, a gear-wheel mechanism having a 17° involute or line of action and a standard length of tooth allows the use of any ratio of gears while still maintaining two pairs of teeth continuously in contact. The foregoing Figures 2, 3 and 4 and the above formulæ (1, 2 and 5) illustrate the fact that the number of pairs of teeth in contact $M_t$ for a given gear ratio changes with variations in the angle of the line of action $\phi$, thereby illustrating the second method of design.

As brought out in the foregoing figures, it is practically impossible to design a gear-wheel mechanism, having a standard length of tooth, wherein only one pair of teeth is in contact throughout the operation of the mechanism. A gear-wheel mechanism having only one pair of teeth in contact, however, may be developed according to the following method.

The previously mentioned formula (4) for noninterference of gears was derived for teeth of standard length. If, now, the addendum be expressed as a fraction "$q$" of the circular pitch $P_c$, (1) for the number of teeth in contact becomes $$M_p = \frac{n}{2\pi \cos \phi} \left( -\sin \phi + \sqrt{\sin^2 \phi + 4 \cdot \frac{\pi q n + \pi^2 q^2}{n^2}} \right), \quad (1^a)$$

and the interference formula (4) takes the form $$\frac{n}{N} = \frac{4\pi q n - 2n^2 \sin^2 \phi}{n^2 \sin^2 \phi - 4n^2 q^2} \quad (6)$$

Expressing the gear ratio $\frac{N}{n}$ as $k$, the interference formula (6) becomes $$n = \frac{2\pi q [k + \sqrt{k^2 + (2k+1)\sin^2 \phi}]}{(2k+1) \sin^2 \phi} \quad (6^a)$$

Figure 4:
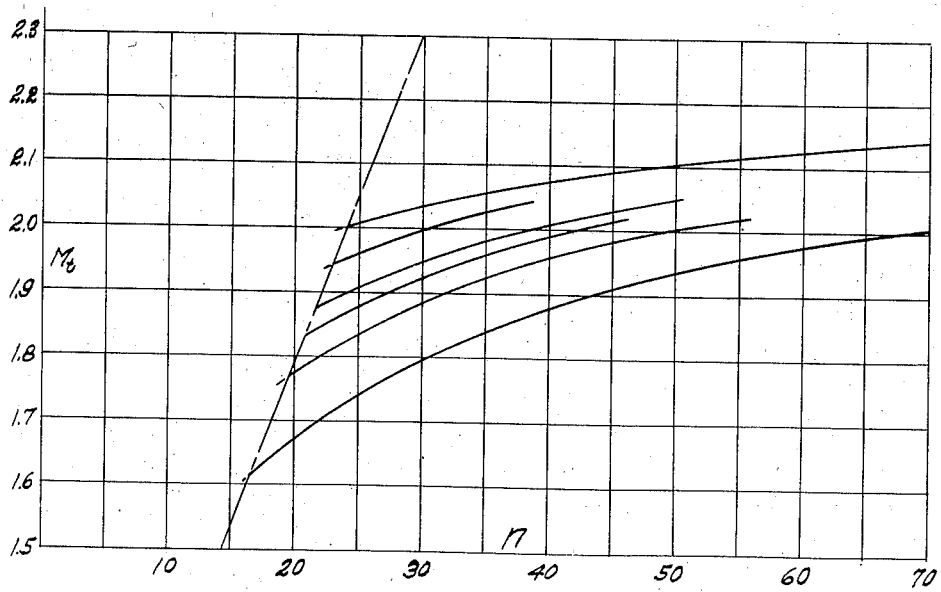
Fig. 4 is a view similar to Fig. 3 for a 17° standard tooth.

In Fig. 4, the dot-and-dash line is the locus of $n$ for different values of the gear-ratio $k$, for standard gears wherein $$q = \frac{1}{\pi}.$$

For the condition of rack and pinion $$\frac{n}{N} = 0,$$

and formula (6) reduces to $$n = \frac{2\pi q}{\sin^2 \phi} \quad (7).$$

And similarly, formula (2) then becomes $$n = \frac{\pi q^2 - \pi M_p^2 \cos^2 \phi}{M_p \sin \phi \cos \phi - q}, \quad (8)$$

and formula (5) becomes $$N = \frac{\pi M_g^2 \cos^2 \phi - \pi q^2}{M_g \sin \phi \cos \phi - q} \quad (8^A)$$

which are the general formulæ for obtaining the number of pairs of teeth in contact $M_t$ for gear teeth of any length in external and internal gear mechanisms, respectively.

In the case of the rack, $n$ of formula (8) becomes infinite and $M_R$ substituted for $M_R$;

$$M_R \sin \phi \cos \phi - q = 0,$$

and $$M_R = \frac{q}{\sin \phi \cos \phi} \quad (9)$$

Combining (7) and (8)

$$\frac{2\pi q}{\sin^2 \phi} = \frac{\pi q^2 - \pi M_p^2 \cos^2 \phi}{M_p \sin \phi \cos \phi - q}$$

Clearing:

$$2\pi M_p q \sin \phi \cos \phi - 2\pi q^2 = \pi q^2 \sin^2 \phi - \pi M_p^2 \sin^2 \phi \cos^2 \phi.$$

Combining terms:

$$M_p^2 \sin^2 \phi \cos^2 \phi + 2M_p q \sin \phi \cos \phi - (2q^2 + q^2 \sin^2 \phi) = 0.$$

Solving:

$$M_p = \frac{-q \sin \phi \cos \phi \pm \sqrt{q^2 \sin^2 \phi \cos^2 \phi + \sin^2 \phi \cos^2 \phi (2q^2 + q^2 \sin^2 \phi)}}{\sin^2 \phi \cos^2 \phi}$$

$$= \frac{-q \pm q\sqrt{3 + \sin^2 \phi}}{\sin \phi \cos \phi}$$

Referring also to equation (9), we find that

Solving:

$$M_T = M_R + M_p = \frac{q}{\sin \phi \cos \phi} - \frac{q}{\sin \phi \cos \phi} \pm \frac{q\sqrt{3+\sin^2 \phi}}{\sin \phi \cos \phi}$$

$$M_T = M_R + M_p = \frac{q}{\sin \phi \cos \phi} - \frac{q}{\sin \phi \cos \phi} + \frac{q\sqrt{3+\sin^2 \phi}}{\sin \phi \cos \phi}$$

Solving:

$$q = M_T \frac{\sin \phi \cos \phi}{\sqrt{\sin^2 \phi + 3}} \quad (10)$$

When $M_T = 1$, $$q = \frac{\sin \phi \cos \phi}{\sqrt{\sin^2 \phi + 3}} \quad (11)$$

Figure 6:
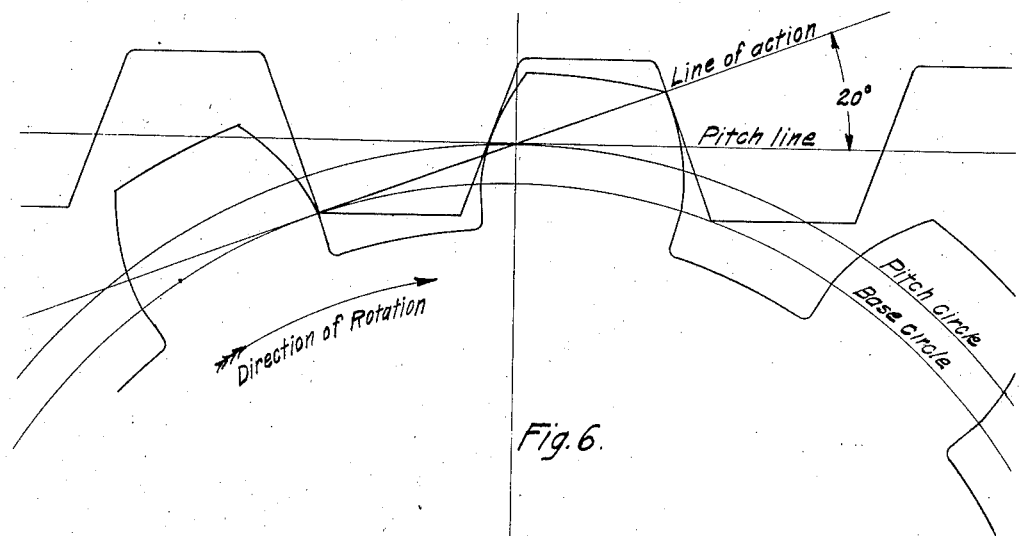
Fig. 6 is a view of a rack and pinion designed according to the third method of design.
Figure 5:
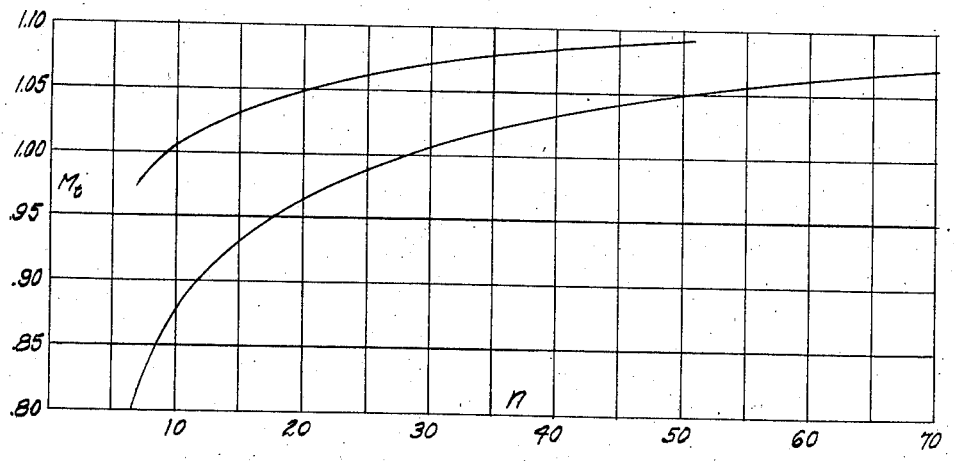
Fig. 5 is a view similar to Fig. 3 but employing an addendum of 0.182 $P_c$ and a 20° involute.

For 20° stub-tooth gears, using formula (11) "$q$" works out to be approximately 0.182. The tooth contact curves showing the relation between the total number of teeth in contact $M_t$ and the number of pairs of teeth in the pinion for different gear ratios are shown in Fig. 5, assuming an addendum of 0.182 $P_c$ and a 20° involute. Figure 6 shows a rack and pinion designed according to the above method and the appearance of the teeth.

Thus, it is seen that by employing the method just described, namely that of choosing a proper length for the tooth addendum, which constitutes the third method of design, it is possible to provide a gear-wheel mechanism having but a single pair of teeth in contact at all times.

The fourth method of designing a pair of intermeshing gear wheels such that an integral number of pairs of teeth are constantly in mesh is that of increasing or decreasing the distance between the centers of the gears, said distance being calculated according to the following method. This method may, with suitable arrangements, be used while the gears are in operation.

Figure 7:
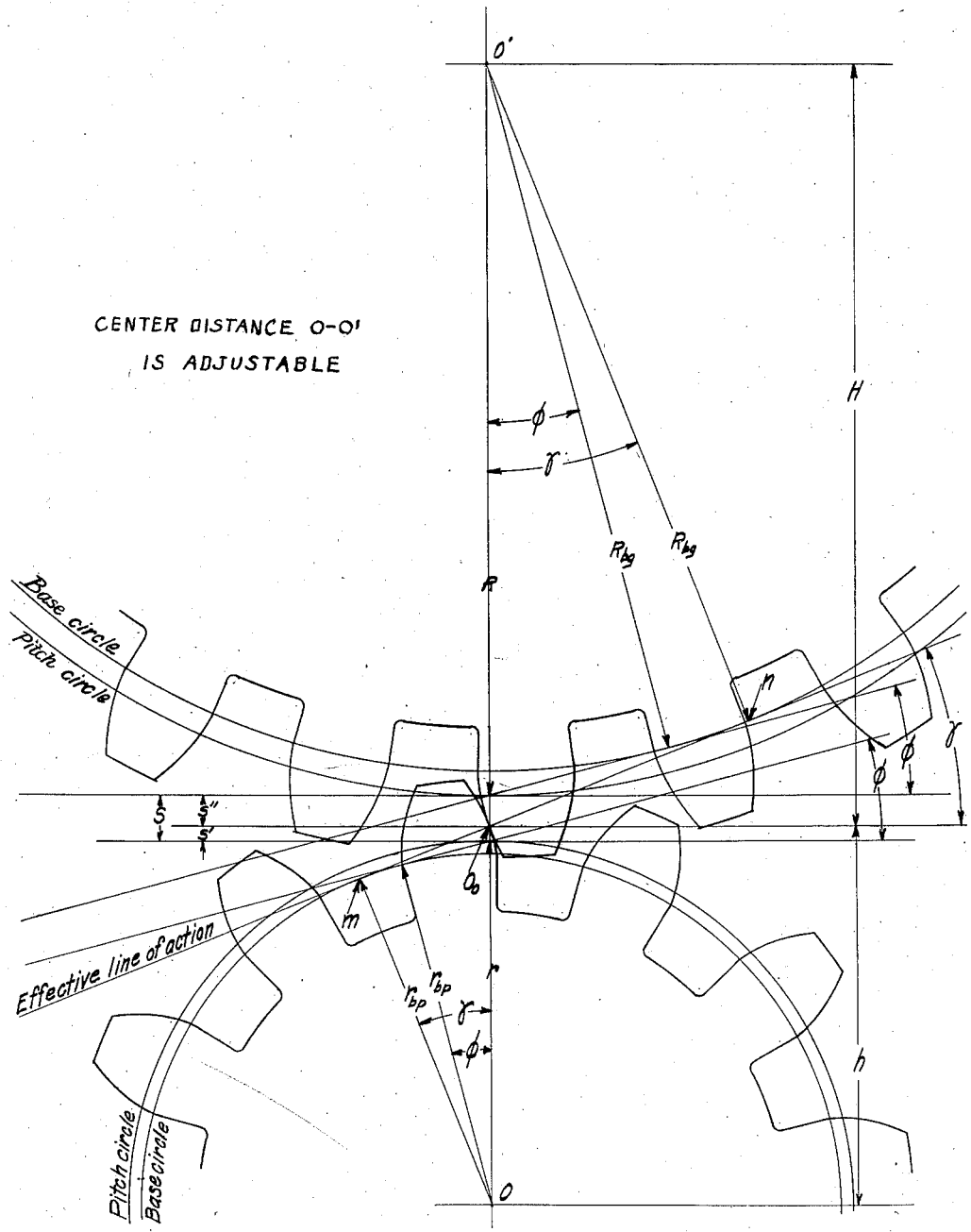
Fig. 7 is a diagram showing a pair of meshing gear wheels, together with certain other details which will be used in the mathematical analysis of the fourth method of design.

In Fig. 7, is shown a pair of meshing gear wheels, the pitch circles of which are separated by an amount S. The effect of such separation is to change not only the effective line of action from an angle of obliquity $\phi$ to a different angle $\gamma$, but also to change the effective length of the addendum of the gear and pinion, the latter being altered by the amounts $s'$ and $s''$, respectively. The value of $\gamma$ and of $s'$ and $s''$ may be calculated as follows:

Referring to Fig. 7, it is seen that the effective line of action is changed from an angle of obliquity $\phi$ to an unknown angle $\gamma$ by the separation of the centers of the gears shown a distance S. The distance S is greatly exaggerated for the sake of clearness. The new line of action which is thus formed divides the length of the line S into two parts $s'$ and $s''$ such that $S=s'+s''$. The following relations obtain:

$$\overline{o'-n}=R_{bg}=R\cos\phi \quad (12)$$

and the line is drawn perpendicular to $\overline{m-n}$, also $$\overline{o-m}=r_{op}=r\cos\phi \quad (13)$$

and this line is drawn perpendicular to $m-n$. The right triangles $(O-m-O_o)$ and $(O'-n-O_0)$ are, therefore, similar, since the sides of one are parallel to the sides of the other. The angles marked $\gamma$ are therefore equal. Moreover, $$H=R_{bg}\sec\gamma=R\cos\phi\sec\gamma \quad (14)$$
$$s''=H-R=R\cos\phi\sec\gamma-R \quad (15)$$
$$s''=kr\cos\phi\sec\gamma-kr \quad (16)$$
$$s''=k(r\cos\phi\sec\gamma-r) \quad (17)$$

Similarly, $$h=r_{bp}\sec\gamma=r\cos\phi\sec\gamma \quad (18)$$
$$s'=h-r=r\cos\phi\sec\gamma-r \quad (19)$$

The ratio of $s'$ to $s''$ is therefore from (17) and (19).

$$\frac{s'}{s''}=\frac{r\cos\phi\sec\gamma-r}{k(\cos\phi\sec\gamma-r)}=\frac{l}{k}=\frac{n}{N}=\frac{r}{R} \quad (20)$$

$$S=s'+s''=s'+ks'=(k+l)s'. \quad (21)$$

$$s'=\frac{S}{k+l} \quad (22)$$

$$S=s''+\frac{s''}{k}=\frac{s''(k+l)}{k} \quad (23)$$

$$s''=\frac{kS}{k+l}=\frac{S}{l+l/k} \quad (24)$$

$$h=r-s'=r-\frac{S}{k+l} \quad (25)$$

$$\cos\gamma=\frac{r_{bp}}{h}=\frac{r\cos\phi}{r+\frac{S}{k+l}} \quad (26')$$

If S be expressed as a fraction $\omega$ of $r$, then $$S=\omega r \quad (26),$$

and (26') becomes $$\cos\gamma=\frac{r\cos\phi}{r+\frac{\omega r}{k+l}}=\frac{\cos\phi}{l+\frac{\omega}{k+l}} \quad (27)$$

Equation (27) gives the angle of the effective line of action.

For the condition of rack and pinion, that is where $k=\infty$, equation (27) reduces to $\cos\gamma=\cos\phi$. It will also be seen from Fig. 7 that the effect of increasing the distance between the centers of the gears an amount equal to S not only changes the obliquity of the line of action, but also, in effect, shortens the effective length of the addendum of the gear teeth an amount $s''$, and similarly, the effective length of the pinion teeth an amount equal to $s'$. For the condition of one-to-one gear ratio, both gears, of course, have the same decrease in the effective length of the addendum.

Figure 8:
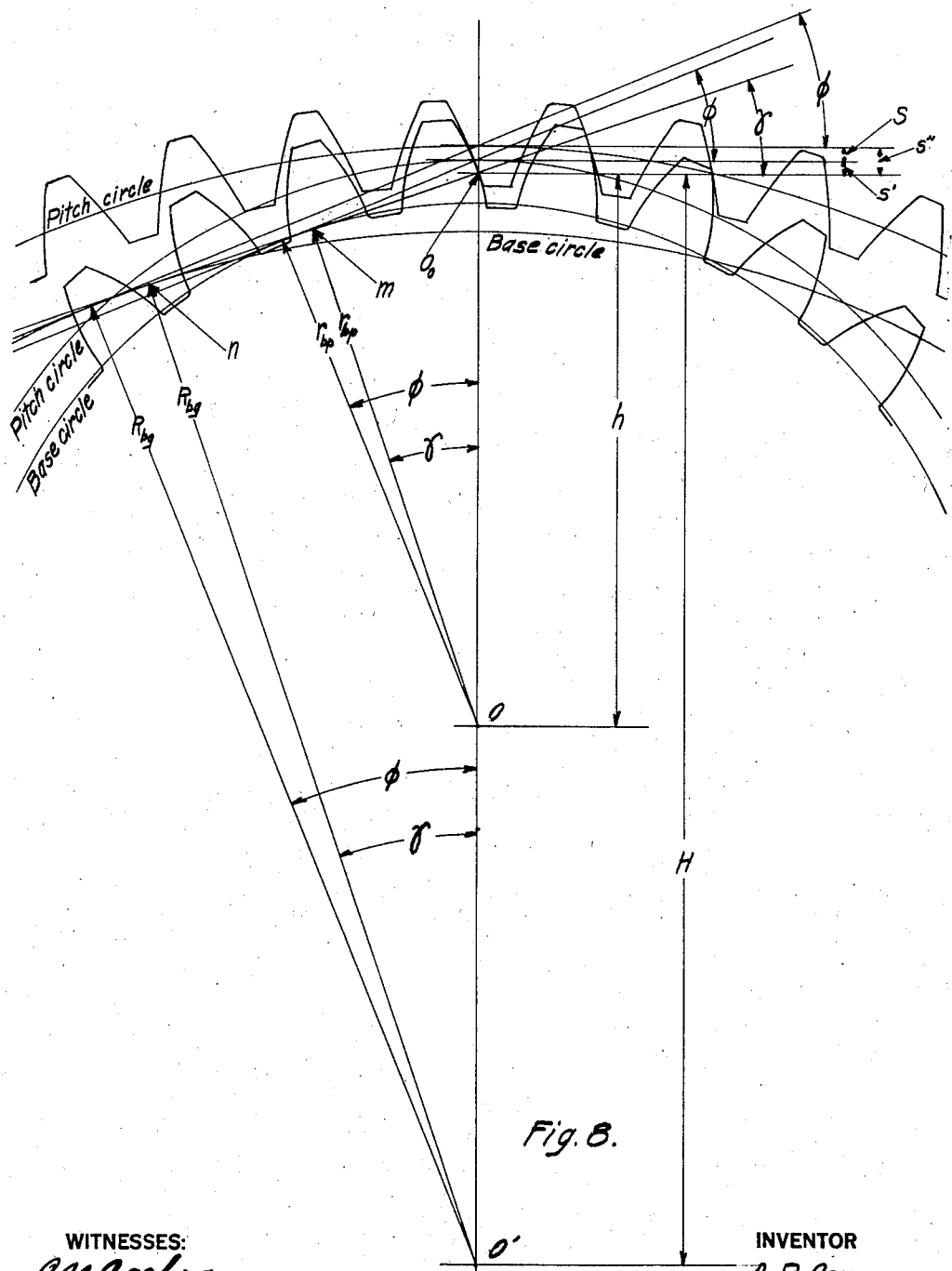
Fig. 8 is a view showing the fourth method of design applied to a pair of internal mating gear wheels.

In the design of internal gear-wheel mechanisms according to this method, the procedure is as follows:

In Fig. 8 is shown a pair of internal mating gear wheels wherein the several portions thereof are identified by symbols corresponding in significance to those of Fig. 7. Triangles $o-m-o_o$ and $o'-n-o_o$ are similar since the sides of one are parallel to those of the other. The angles marked $\gamma$ are therefore equal. Furthermore, $$H=R_{og}\sec\gamma=R\cos\phi\sec\gamma. \quad (28)$$
$$s''=R-H=R-R\cos\phi\sec\gamma. \quad (29)$$
$$s''=kr-kr\cos\phi\sec\gamma=k(r-r\cos\phi\sec\gamma). \quad (30)$$

Similarly, $$h=r_{bp}\sec\gamma=r\cos\phi\sec\gamma. \quad (31)$$
$$s'=r-h=r-r\cos\phi\sec\gamma. \quad (32)$$

The ratio of $s'$ to $s''$ is, therefore, from equations (30) and (32), $$\frac{s'}{s''}=\frac{l}{k}=\frac{n}{N}=\frac{r}{R} \quad (33)$$

$$S=s''-s'=ks'-s'=s'(k-l) \quad (33')$$

$$s'=\frac{S}{k-l} \quad (34)$$

$$S=s''-\frac{s''}{k}=\frac{s''(k-l)}{k} \quad (35)$$

$$s''=\frac{kS}{k-l}=\frac{S}{l-l/k} \quad (36)$$

$$h=r-s'=r-\frac{S}{k-l} \quad (37)$$

$$\cos\gamma=\frac{r_{bp}}{h}=\frac{r\cos\phi}{r-\frac{S}{k-l}} \quad (38)$$

If $S=\omega r$, as stated in equation (26), then equation (38) becomes $$\cos\gamma=\frac{\cos\phi}{l-\frac{\omega}{k-l}} \quad (39)$$

Using the effective length of addendum $A-s'$ for an external pinion, $A-s''$ for an external gear, $A+s'$ for a pinion mating with an internal gear and $A-s''$ for an internal gear and also using the effective angle of obliquity γ, calculated by formula (27) or (39), the values so obtained may be employed in the formulæ (8) and (8ª) to obtain an integral number of pairs of teeth in contact in a given pair of gears. The foregoing illustrates the fourth method of design.

The following advantages obtain in a pair of gear wheels, the centers of which are separated a predetermined amount S; namely, tooth interference is decreased, thereby allowing the use of a smaller number of teeth in the pinion than is ordinarily considered good practice and, in addition, the slip of the gear teeth is decreased, thereby resulting in a corresponding increase in the operating efficiency of the gear wheels.

The foregoing methods of design are applicable to any type of spur gear wheel mechanism embodying either internal or external gear combinations, also bevel gears or helical gears, and may be used either singly or in combination to obtain the desired result. In applying the foregoing formulæ (8 and 8ª) to bevel gears, however, the effective ratio and the effective number of teeth of the meshing gears must be used.

As shown in the American Machinist for January 19, 1922, the effective number of teeth $N_e$ in a bevel gear pinion is equal to $n$ sec B (40) and similarly, the effective number of teeth $N_e$ in a bevel gear is equal to $N_{csc}$ B (41). The effective ratio $K_e$ is there shown to be equal to $K^2$, where K is the ratio of the number of teeth of the gear to the number of teeth of the pinion.

In applying formulæ (8) and (8ª) to helical gear-wheel mechanisms, the effective ratio and the effective number of teeth must also be used, according to formulæ derived in the January 19, 1922 number of the American Machinist. These formulæ for determining the effective values differ from those for bevel gears as follows:

For helical gear wheels having parallel shafts $$n_e = n \sec^3 \alpha \quad (42)$$

and $$N_e = N \sec^3 \alpha \quad (42^a)$$

and $$K_e = K. \quad (43)$$

The following methods of design, namely, the fifth and sixth, apply to helical gears only. The fifth method is that of choosing a suitable helix angle for the direction of the tooth across the pitch face of the gear wheel, while the sixth method is that of choosing a suitable width for the face of the gear wheel. Referring to the first method just mentioned, the design procedure is as follows:

In the American Machinist for January 19, 1922, it was shown that helical gears with parallel shafts could be dealt with in the same manner as ordinary spur gears using the effective value of the angle of line of action in the plane of rotation, and expressing the relative length of addendum in terms of the circular pitch in this plane.

The equations for determining the effective values of the variables $P_k$, $q_x$ and $\phi'$ for use in the formulæ (8) and (8ª) are as follows:

$$P_x = P_c \sec \alpha. \quad (44)$$

Also from the definition of $qA = qP_c$.

$$q_x = \frac{A}{P_x} = \frac{qP_c}{P_c \sec \alpha} = q \cos \alpha. \quad (45)$$

The effective value of the angle of the line of action in this plane is found by the formula $\tan \phi' = \tan \phi \sec \alpha$ or $\phi' = \tan^{-1} [\tan \phi \sec \alpha]$ (46). Substituting the above determined values, formula (1) for the number of pairs of teeth in contact in this plane then becomes.

$$M_p = \frac{n}{2\pi \cos \phi'} \left[ -\sin \phi' \pm \sqrt{\sin^2 \phi' + \frac{4\pi q_x}{n^2}(n+l)} \right] \quad (47)$$

Since both $\alpha'$ and $q_x$ depend on the angle $\alpha$ for their value, the value of $M_p$ and therefore $M_t$ may be altered as desired by properly choosing the value of $\alpha$. This illustrates the fifth method of spur gear design. This type of gear may be considered as made up of a large number of spur gears of infinitesimally small width, and when the variables are so chosen as to make $M_t$ an integer, each of these gears of infinitely small width may be considered as having a tooth coming into contact just at the instant a tooth is leaving contact. Thus, a constant total tooth length may also be made to carry the load in this type of gear.

It is customary, in helical gears with parallel shafts to combine on one shaft two gears which are exactly alike, with the exception that the teeth of one are cut in a right hand helix and the teeth of the others in a left hand helix. This takes care of the end thrust due to the angle of the teeth across the face of the gear. If these gears and those with which they mesh be made of the proper width and the teeth of each pair be cut in the proper relation to each other, a constant total length of tooth carrying the load may be obtained even though a given plane section of the gear may not show an integral number of pairs of teeth in contact, all as brought out in the following analysis.

Fig. 9 is a diagrammatic plan view of a pair of helical racks 1 and 2, wherein the teeth are cut according to a right hand helix and according to a left hand helix, respectively.

Figure 10:
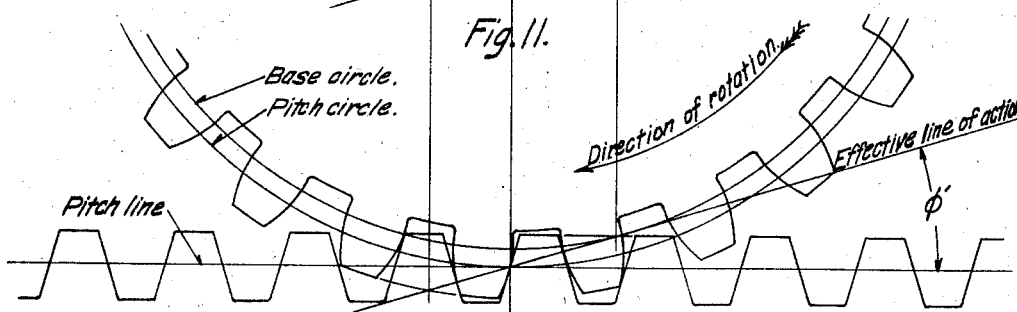
Fig. 10 is a detail longitudinal sectional view of the lower edges of the half of the helical rack having right hand teeth, together with a corresponding section of a helical pinion meshing therewith.

Fig. 10 is a detail longitudinal sectional view of the lower edge of the helical rack 1 having right hand teeth as shown in Fig. 9, together with a corresponding section of a helical pinion meshing therewith.

Figure 11:
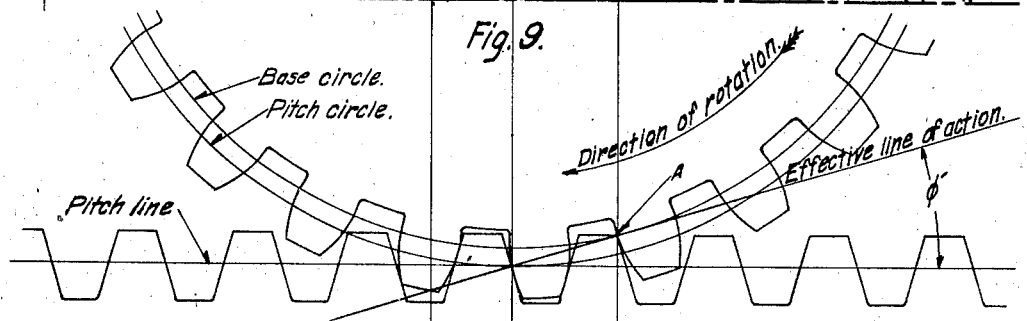
Fig. 11 is a detail longitudinal sectional view of the upper edges of the helical rack having left hand teeth, together with a corresponding section of a helical pinion meshing therewith.

Fig. 11 is a detail longitudinal sectional view of the upper edge of the helical rack 2 having left hand teeth, as shown in Fig. 9, together with a corresponding section of a helical pinion meshing therewith. Hence, it follows that the two halves 1 and 2 of the rack have been placed in such relation to each other that when a tooth of the lower half 2 is just beginning to make contact at A, a tooth of the upper half 1 is just finishing making contact at A'. The width of either rack must be so chosen that when a tooth, say C, of the upper edge of the lower half 2 of the rack is just beginning to leave contact, a tooth, say C', of the upper edge of the upper half 1 of the rack will have just finished leaving contact. Hence, the same sum-total helical length of teeth will then be carrying the load transmitted by the gearing and a uniform steady driving effect will be obtained. A rack and pinion was chosen in order to make the foregoing explanation simple, but the same effects obtain for any ratio of helical gears.

From Fig. 9, $$V = \frac{P_x}{2} = \frac{P_o}{2 \cos \alpha} = \frac{\pi}{2P_n \cos \alpha} \quad (48)$$

From Fig. 9, $$W_o = V \cot \alpha = \frac{\pi}{2P_n \sin \alpha} \quad (49)$$

If it is desired to make the gear face wider than $W_o$, each gear-half width must be increased in increments of $W_o$, as indicated in broken lines in Fig. 9.

From Fig. 9, it is seen that when a gear half has a face width of $2W_o$ and when a tooth of the gear half 2 is just beginning to make contact at A, another tooth of the same gear half is just finishing making contact at A'', and when a tooth, say C, is just beginning to leave contact, another tooth of the same gear half will have just finished leaving contact at C'', so that the total length of load-carrying tooth of the gear half is maintained substantially constant.

$$\overline{AB} = \frac{M_t P_o \cos \phi}{\cos \alpha} = \frac{\pi M_t \cos \phi'}{P_n \cos \alpha}, \text{ where } P_o = \frac{\pi}{P_n}$$

$$w_o = \overline{AB} \cos \phi' \tan \alpha$$

$$= \frac{\pi M_t \cos^2 \phi' \tan \alpha}{P_n \cos \alpha} \quad (50)$$

It is to be further noted that the distance between the two halves of the rack is not material to the design of the gear combination.

While I have described certain forms of my invention in detail and while I have pointed out certain of the most obvious principles and purposes thereof, I do not intend that the language employed in the following claims shall be limited to the precise features described, but I intend that the claims shall be construed to cover all combinations which are fairly included in the language thereof, when read in connection with the prior art, regardless of the details and functions set forth in the description or illustrated in the drawing.

I claim as my invention:

1. A pair of co-operating gear wheels wherein a predetermined number of pairs of teeth are constantly in mesh.

2. A pair of co-operating gear wheels wherein a predetermined number of pairs of teeth on the driving gear wheel are constantly in mesh with a predetermined number of teeth on the driven gear wheel.

3. A gear-wheel mechanism comprising a pair of mating gear wheels embodying a design wherein a constant integral number of pairs of teeth are in contact at all times.

4. A loaded gear-wheel mechanism comprising a pair of mating gear wheels embodying a design wherein a constant total length of tooth is carrying the load at all times.

5. A gear-wheel mechanism comprising a pair of mating gear wheels embodying such design that the product of the total number of pairs of teeth in contact and the width of the face of either gear is a constant quantity.

6. A loaded helical gearing aggregate embodying such design that the total length of tooth carrying the load at every instant is substantially constant.

7. A loaded helical gearing aggregate embodying such design that every time any pair of teeth are beginning to make contact, another pair of teeth are at substantially the same time finishing making contact, and every time any pair of teeth are beginning to leave contact, another pair of teeth are at substantially the same time finishing leaving contact.

8. A loaded gear-wheel mechanism comprising a pair of mating gears having an adjustable center-distance between them, the design being such as to make the total length of contacting teeth substantially independent of the rotative movement of the gears.

9. An involute gear-wheel mechanism comprising a pair of mating gears having an adjustable center-distance between them, the design being such as to make the total length of contacting teeth substantially independent of the rotative movement of the gears.

10. An involute gear-wheel mechanism comprising a pair of mating gear wheels embodying a design wherein a constant integral number of pairs of teeth are in contact at all times.

11. An involute helical gearing aggregate embodying such design that the total length of tooth carrying the load at every instant is substantially constant.

12. A pair of meshing involute gears wherein the number of teeth between the line of centers and the outside diameter of one gear, plus the number of teeth between the line of centers and the outside diameter of the other gear is a substantially integral number, said number of teeth for either gear being $$M_p = \frac{n}{2\pi \cos \phi}\left[-\sin \phi + \sqrt{\sin^2 \phi + \frac{4}{n^2}(\pi n q + \pi^2 q^2)}\right]$$

where $n$ is the number of teeth in said gear, $\phi$ is the pressure angle, and $q$ is the ratio of the addendum to the circular pitch.

13. A pair of meshing involute gears wherein the number of teeth between the line of centers and the outside diameter of one gear, plus the number of teeth between the line of centers and the outside diameter of the other gear is a substantially integral number, said number of teeth for either gear being $$M_p = \frac{n}{2\pi \cos \phi}\left[-\sin \phi + \sqrt{\sin^2 \phi + \frac{4}{n^2}(\pi n q + \pi^2 q^2)}\right]$$

where $n$ is the number of teeth in said gear, $\phi$ is the pressure angle, $q$ is the ratio of the addendum to the circular pitch, and the number of teeth on the smaller of the gears being at least as large as the value given by the equation $$n = \frac{2\pi q[k + \sqrt{k^2 + (2k+1)\sin^2 \phi}]}{(2k+1)\sin^2 \phi}$$

where $k$ is the gear ratio.

14. A pair of meshing helical gears wherein the total face width $W_o$ is given by the formula $$W_o = \frac{\pi}{P_n \sin \alpha},$$

where $P_n$ is the normal pitch and $\alpha$ is the helix angle.

15. A pair of double helical gears wherein the face width $W_o$ of each gear half is given by the formula $$W_o = \frac{\pi}{2P_n \sin \alpha},$$

where $P_n$ is the normal pitch and $\alpha$ is the helix angle, the teeth of the two halves of each gear being staggered a distance $$V = \frac{\pi}{2P_n \cos \alpha}$$

relatively to each other.

In testimony whereof, I have hereunto subscribed my name this 27th day of September, 1922.

ANTHONY B. COX.

Certificate of Correction.

It is hereby certified that in Letters Patent No. 1,525,642, granted February 10, 1925, upon the application of Anthony B. Cox, of Pittsburgh, Pennsylvania, for an improvement in "Gear Teeth and Methods of Designing the Same," errors appear in the printed specification requiring correction as follows: Page 2, line 113, for the character "$x$" read $\alpha$; page 4, line 112, for "$4n^2q^2$" read $4\pi^2q^2$ in the denominator of equation (6); page 5, line 40, for "$\pi q^2 \sin \varphi$" read $\pi q^2 \sin^2 \varphi$; page 6, line 14, for "$r_{op}$" read $r_{bp}$; pages 6 and 7, in equations (20) to (25), inclusive, (26'), (27), (33), (33'), (34) to (39), inclusive, and (47), and in the second equation in claim 13, for the character "$l$", each occurrence, read $1$; page 6, line 90, for "$R_{og}$" read $R_{bg}$; page 7, line 34, for "$N_{csc}B$" read $N cscB$; same page, line 72, for "$P_k$" read $P_x$; line 76, for "$q^A$" read $q, A$; same page, line 87, for "$\alpha'$" read $\varphi'$; page 8, strike out the three equations between lines 54 and 55; and that the said Letters Patent should be read with these corrections therein that the same may conform to the record of the case in the Patent Office.

Signed and sealed this 10th day of March, A. D. 1925.

[SEAL.]

KARL FENNING,
*Acting Commissioner of Patents.*